(12) United States Patent
Santhar et al.

(10) Patent No.: US 11,875,300 B2
(45) Date of Patent: Jan. 16, 2024

(54) PERISHABLE ASSET TRACKING FOR BLOCKCHAIN

(71) Applicant: International Business Machines Corporation, Armonk, NY (US)

(72) Inventors: Sathya Santhar, Chennai (IN); Sarbajit K. Rakshit, Kolkata (IN); Samuel M. Jawaharlal, Chennai (IN); Balamurugaramanathan Sivaramalingam, Paramakudi (IN)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 16/033,738

(22) Filed: Jul. 12, 2018

(65) Prior Publication Data
US 2020/0019923 A1    Jan. 16, 2020

(51) Int. Cl.
*G06Q 10/0832* (2023.01)
*H04L 9/06* (2006.01)
*G06Q 10/083* (2023.01)
*G06Q 10/087* (2023.01)

(52) U.S. Cl.
CPC ....... *G06Q 10/0832* (2013.01); *G06Q 10/087* (2013.01); *G06Q 10/0838* (2013.01); *H04L 9/0637* (2013.01)

(58) Field of Classification Search
CPC ............. G06Q 10/087; G06Q 10/0875; G06Q 10/0832; G06Q 10/0838; H04L 9/0637
USPC .......................................................... 705/28
See application file for complete search history.

(56) References Cited

U.S. PATENT DOCUMENTS

| | | | |
|---|---|---|---|
| 10,360,617 B2 * | 7/2019 | High | G06Q 30/0641 |
| 2003/0216969 A1 * | 11/2003 | Bauer | H01Q 7/00 705/22 |
| 2009/0095813 A1 * | 4/2009 | Chang | G06Q 10/087 235/385 |
| 2016/0379165 A1 * | 12/2016 | Moakley | H04W 4/029 705/333 |
| 2017/0048216 A1 | 2/2017 | Chow et al. | |
| 2017/0124633 A1 | 5/2017 | Natarajan et al. | |
| 2018/0096347 A1 * | 4/2018 | Goeringer | H04L 9/3247 |
| 2018/0144292 A1 * | 5/2018 | Mattingly | G06F 16/903 |
| 2018/0342007 A1 * | 11/2018 | Brannigan | G06Q 30/0635 |
| 2019/0266557 A1 * | 8/2019 | Berk | G06Q 10/0832 |

OTHER PUBLICATIONS

Kshetri, Nir, "Blockchain's roles in meeting key supply chain management objectives," International Journal of Information Management 39 (2018): 80-89.

(Continued)

*Primary Examiner* — Ariel J Yu
*Assistant Examiner* — Denisse Y Ortiz Roman

(57) ABSTRACT

An example operation may include one or more of receiving, by a blockchain node, a first transaction comprising an asset identifier and an expiration date, verifying the expiration date has not changed from one or more previous transactions comprising the asset identifier, calculating an expected delivery date for an asset corresponding to the asset identifier, validating the first transaction in response to the expected delivery date not later than the expiration date. and committing the first transaction to a blockchain.

20 Claims, 11 Drawing Sheets

(56) References Cited

OTHER PUBLICATIONS

Ruta, Michele, et al., "Poster: Supply Chain Object Discovery with Semantic-enhanced Blockchain," 2017, 2 pages.
Tian, Feng, "An agri-food supply chain traceability system for China based on RFID & blockchain technology," 2016 13th International Conference on Service Systems and Service Management (ICSSSM), pp. 1-6. IEEE, 2016.

* cited by examiner

US 11,875,300 B2

PERISHABLE ASSET TRACKING FOR BLOCKCHAIN

TECHNICAL FIELD

This application generally relates to logistics within blockchain networks, and more particularly, to perishable asset tracking for a blockchain.

BACKGROUND

A ledger is commonly defined as an account book of entry, in which transactions are recorded. A distributed ledger is ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL. While the description and figures herein are described in terms of a blockchain, the instant application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer and verify information. Since a blockchain is a distributed system, before adding a transaction to the blockchain ledger, all peers need to reach a consensus status.

Conventionally, asset-related blockchain transactions are simply processed in the order they appear, which is limited by expiration dates for perishable assets. As such, what is needed is a way to track, expedite, and disqualify perishable asset transactions in order to overcome these limitations.

SUMMARY

One example embodiment may provide a method that includes one or more of receiving, by a blockchain node, a first transaction comprising an asset identifier and an expiration date, verifying the expiration date has not changed from one or more previous transactions comprising the asset identifier, calculating an expected delivery date for an asset corresponding to the asset identifier, validating the first transaction in response to the expected delivery date not later than the expiration date. and committing the first transaction to a blockchain.

Another example embodiment may provide a system that includes a blockchain network, which includes a manufacturer node, configured to manufacture an asset, and a first logistics node. The first logistics node includes a memory and a processor, coupled to the memory, where the processor is configured to perform one or more of receive a first transaction, the first transaction comprises an asset identifier and an expiration date, verify the expiration date has not changed from any previous transactions which comprises the asset identifier, calculate an expected delivery date for the asset corresponding to the asset identifier, validate the first transaction in response to the expected delivery date not later than the expiration date, and commit the first transaction to a blockchain.

A further example embodiment may provide a non-transitory computer readable medium comprising instructions, that when read by a processor, cause the processor to perform one or more of receiving, by a blockchain node, a first transaction comprising an asset identifier and an expiration date. verifying the expiration date has not changed from one or more previous transactions comprising the asset identifier, calculating an expected delivery date for an asset corresponding to the asset identifier, validating the first transaction in response to the expected delivery date not later than the expiration date, and committing the first transaction to a blockchain.

DETAILED DESCRIPTION

Figure 1A:
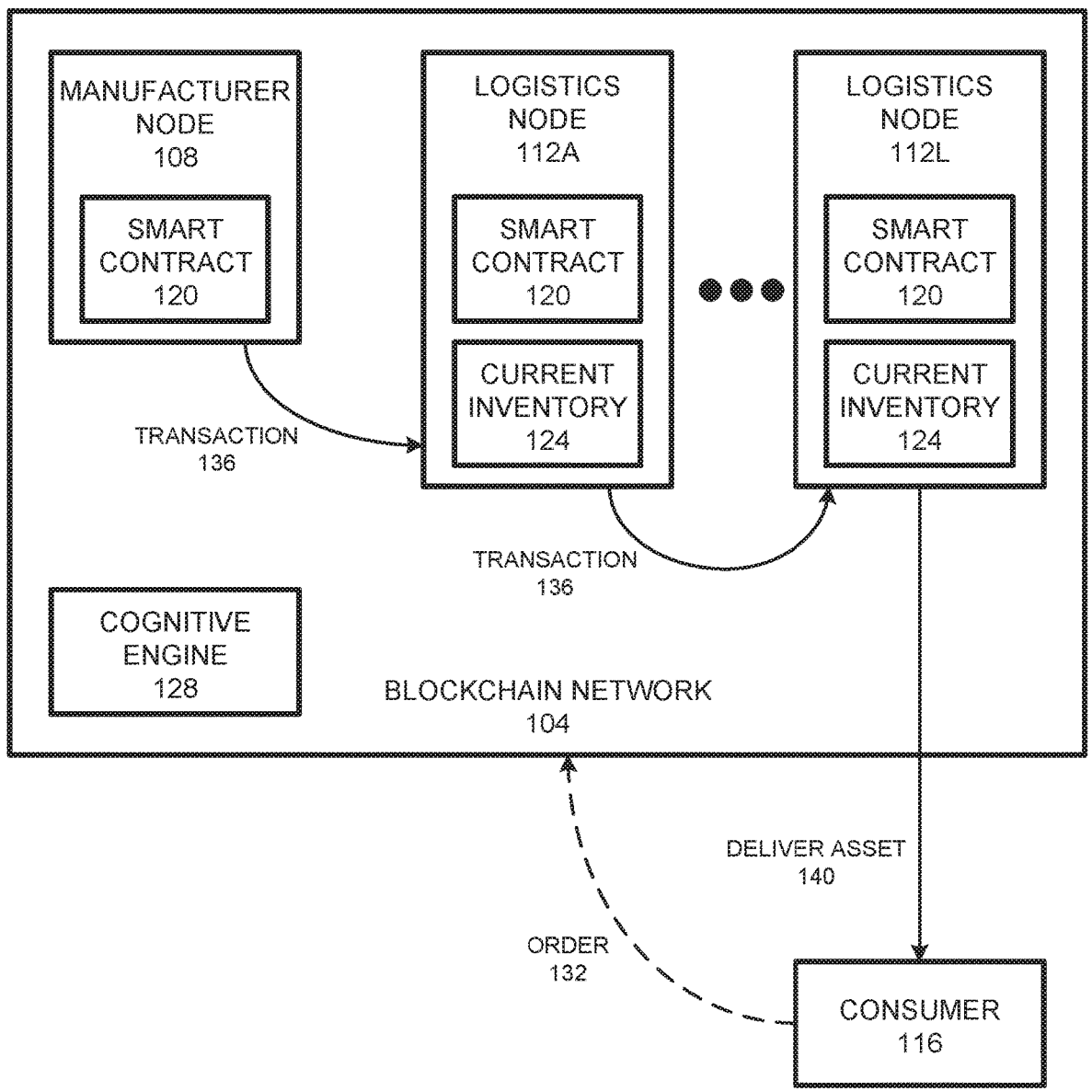
FIG. 1A illustrates a network diagram of a system for efficiently tracking and delivering perishable assets with a blockchain, according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling. Example embodiments provide methods, systems, non-transitory computer readable media, devices, and/or networks, which provide efficient transaction validation for a blockchain.

A blockchain is a distributed system, which includes multiple nodes that communicate with each other. A blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members, and only endorsed transactions may be committed to the blockchain and have an effect on the state of the blockchain. Other transactions which are not endorsed are disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database, which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

The example embodiments are directed to methods, devices, networks, non-transitory computer readable media and/or systems, which support a blockchain solution that tracks and processes perishable assets. The present application describes methods and systems for enabling the flow of assets in a blockchain network controlled by a cognitive smart contract based on an expiration date for a perishable asset and prediction of a delivery date based on supervised learning of previous transactions. Some of the benefits include providing immutability, smart contracts, security, and consensus.

In any blockchain, immutability would make sure that expiration dates for perishable assets are not modified by any intermediate party in the blockchain, since the smart contract would reject any transaction if the asset has already expired or is predicted to expire before a delivery date for the asset. Smart contracts make cognitive decisions based on supervised learning of past transactions of similar assets, and automatically approve or reject the transaction based on the decision. Security is needed to make sure the data is not altered by any party in the flow, for example, to deliver expired assets to a consumer. Consensus is needed between all the parties involved in the order flow so that every party would abide by the decision taken by the cognitive smart contract.

Blockchain is different from a traditional database in that blockchain is not centralized storage but rather a decentralized, immutable, and secure storage, where nodes must share in changes to records in the storage. The present application is driven by the major blockchain concepts of immutability, consensus, and cognitive smart contracts, which cannot be achieved with traditional databases. Some properties that are inherent in blockchain and which help implement the blockchain include, but are not limited to, an immutable ledgers, smart contracts, security, privacy, decentralization, consensus, endorsement, accessibility, and the like, which are further described herein. According to various aspects, tracking perishable assets is implemented as an improvement to blockchain technology generally, and all blockchain networks whether public or permissioned will benefit from checking perishable aspects for blockchain transactions at each and every logistics node.

One of the benefits of the example embodiments is an improvement of the functionality of a computing system by utilizing historical logistical tracking data for similar assets and the same logistics chain to make asset routing decisions. Through the blockchain solution described herein, a computing system can perform novel functionality by maintaining records for previous transactions that may be accessed by logistics blockchain nodes and a local or remote cognitive engine. This will result in a higher percentage of shipped perishable assets reaching the ordering consumer prior to an expiration date for the perishable assets.

The example embodiments provide numerous benefits over a traditional database. For example, various advantages are achieved by improving perishable asset tracking in blockchains. For example, expiring assets may be rejected within the logistical blockchain, which eliminates unnecessary workload for following logistical nodes by not delivering expired assets to a consumer. If expediting would be required to deliver assets to a consumer before an expiration date, the present application provides such an improvement. Also, the immutable ledger provides a permanent record of previous blockchain transactions, which may be reviewed in order to determine an expected delivery date for similar assets. The improvements provided by the present application are transparent to existing blockchain networks.

Meanwhile, a traditional database could not be used to implement the example embodiments because the improvements described herein are inherent to blockchain technology and blockchain infrastructure. Accordingly, the example embodiments provide for a specific solution to a problem in the arts/field of perishable asset tracking for blockchains.

FIG. 1A illustrates a logic network diagram of a system for efficiently tracking and delivering perishable assets with a blockchain, according to example embodiments. Referring to FIG. 1A, the network 100 includes a blockchain network 104 and a consumer or end user 116. The consumer 116 places an order 132 for an asset to the blockchain network 104, and the blockchain network 104 creates a logistics chain for the asset, and the logistics chain delivers the asset 140 to the consumer 116. In some embodiments, the consumer 116 may be part of the blockchain network 104. However, the present application does not depend on the consumer 116 being part of the blockchain network 104, and in most embodiments it is expected the consumer 116 would be outside the blockchain network 104.

The blockchain network 104 may be either a public or permissioned blockchain network 104, and in the preferred embodiment is a permissioned blockchain network 104. The blockchain network 104 includes a manufacturer node 108 and one or more logistics nodes 112, identified as logistics node 112A through logistics node 112L. The manufacturer node 108 manufactures and ships the asset in response to receiving the order 132. In one embodiment, the manufacturer node 108 receives the order 132 from the consumer 116, while in other embodiments the manufacturer node 108 receives the order 132 from a logistics node 112 or other entity.

Logistics nodes 112 are blockchain network 104 entities tasked with distributing assets, Logistics nodes 112 may include global, regional, or local distributors including air cargo, trucking, railroad, or shipping companies, and may include asset storage facilities or warehouses as well.

The blockchain network 104 may also include a cognitive engine 128. Whenever a blockchain transaction 136 occurs, the smart contract 120 is consulted. It would again consult the cognitive engine 128 with the details of pending transactions 136 (specifying asset, consumer, and expiration date) for prediction. The cognitive engine 128 obtains data from the blockchain network 104 of similar assets, calculates a predicted delivery date, and provides the predicted or estimated delivery date to the smart contract 120. The smart contract 120 would either reject or approve the blockchain transaction 136. The smart contract may use any supervised learning techniques, including any classification or regression algorithms known in the art. In one embodiment, the cognitive engine 128 is included within one or more of the manufacturer node 108 or logistics nodes 112. In other embodiments, the cognitive engine 124 may be a separate server within the blockchain network and accessible to the manufacturer node 108 and logistics nodes 112.

The assets of the present application are finished products that are perishable, and have an expiration date 154. In the preferred embodiment, the assets are drugs or pharmaceuticals with a predefined expiration date 154. In other embodiments, the assets are any other form of perishable finished products having a date by which the products should be delivered to a consumer 116 and consumed/used as appropriate.

Associated with the logistics chain is a series of blockchain transactions 136 that corresponds to each shipment of the asset between blockchain network 104 entities and the consumer 116. Therefore, for the blockchain network illustrated in FIG. 1A, there would be corresponding blockchain transactions 136 for shipping the asset from the manufacturer node 108 to logistics node 112A, between each of the logistics nodes 112 in the logistics chain, and from a final logistics node 112L to the consumer 116 for the delivered asset 140.

Each of the blockchain entities includes a cognitive smart contract 120 that includes a set of defined rules for efficiently managing asset logistics. The cognitive smart contract 120 makes decisions based on the expiration date 154 based on supervised learning of previous transactions 136 of similar assets to either block the transaction 136 or to notify the consumer 116 before approving the transaction 136. Supervised learning is a general concept of machine learning where, based on previous transactions 136 of similar assets, the time that would take for the assets to reach the consumer 116 is predicted. If the predicted or estimated delivery date is beyond the expiration date 154, then the transaction 136 is rejected or an alert is sent to the consumer 116.

In some embodiments, one or more of the logistics nodes 112 may have an associated current inventory 124. The current inventory 124 is updated by the logistics node 112 corresponding to the current inventory 124, and reflects current levels for assets currently under control of that logistics node 112. The current inventory 124 is updated whenever assets are received or shipped from/to that logistics node 112.

Figure 1B:
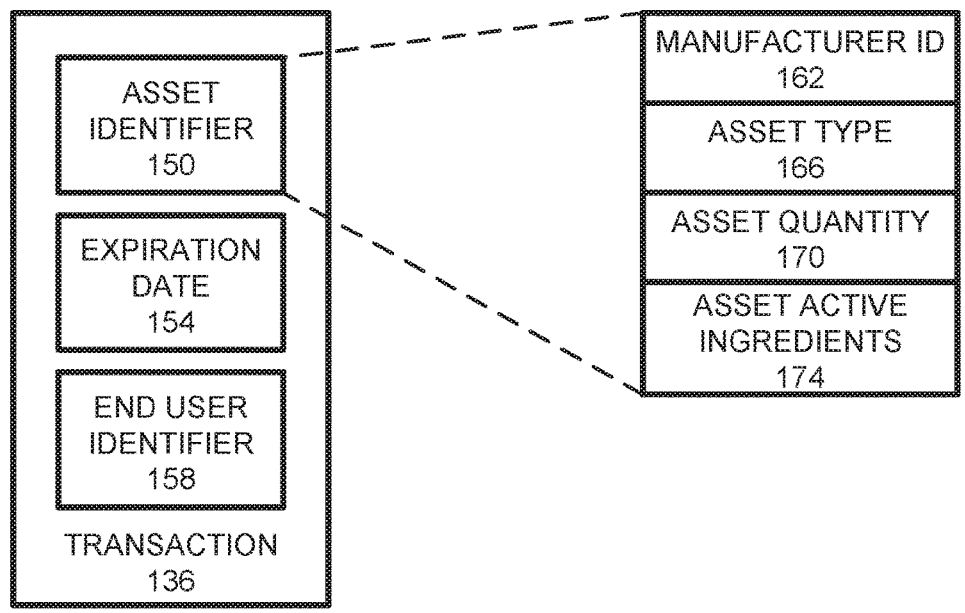
FIG. 1B illustrates a network diagram of a smart contract with a blockchain, according to example embodiments.
Figure 1B:
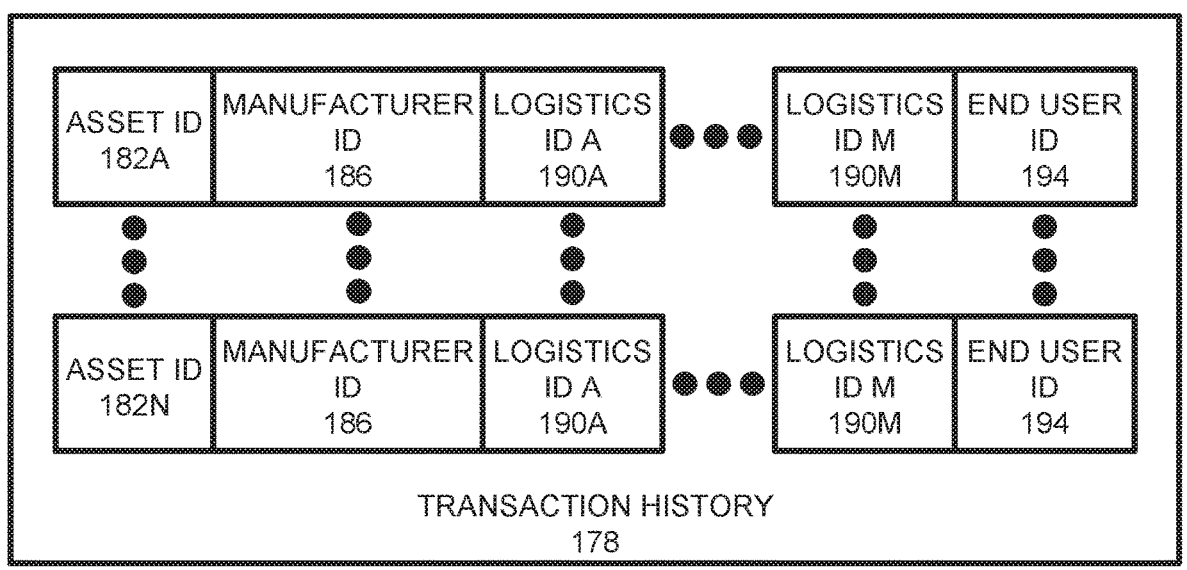

FIG. 1B illustrates another network diagram of a smart contract with a blockchain, according to example embodiments. Referring to FIG. 1B, the smart contract 120 may include one or more transactions 136 for perishable assets. Each of the transactions 136 includes an asset identifier 150, which uniquely identifies the specific asset from all other assets. The transaction 136 also includes an expiration date 154, which is assigned by the manufacturer node 108 and specifies the date at which the asset expires and is no longer either guaranteed or expected to be active or useful. For example, each asset or finished product may have a predefined expiration date 154, such as a drug expiring 90 days from the current date. The transaction 136 also includes an end user identifier 158, which uniquely identifies the consumer 116 intended to receive the asset.

The asset identifier 150 may include other parameters useful to processing transactions 136. A manufacturer ID 162 uniquely identifies a manufacturer node 108 that manufactured the asset and is the source for the logistics chain. An asset type 166 identifies a category for the asset, such as "pharmaceuticals", "laptop computers", "tools", or any other category. Asset types 166 are useful for determining relevant assets within transaction history 178. In some embodiments, the asset identifier 150 may include a Colored Coin (https://en.wikipedia.org/wiki/Colored_coin). A Colored Coin may represent a type of asset. For example, there can be a colored coin C1 created for drugs and another colored coin C2 created for laptop computers. This just represents the type of asset. In the blockchain network 104, a blockchain node A can send 5 C1 assets and 10 C2 assets to blockchain node B.

The asset identifier 150 may also include an asset quantity 170. An asset quantity 170 may reflect a single item, or several items grouped as a strip, a package, a case, a pallet, or any other form of measurement. For example, a drug or pharmaceutical is almost always shipped in some quantity such as 20, 100, 500, 1,000, and so forth. The asset quantity 170 may be useful in determining if a next logistics node 112 in a logistics chain would be likely to process the asset on-time, since a logistics node 112 having a larger current inventory 124 may not be able to process a large quantity 170 of the asset as efficiently as a small quantity 170 of the asset. In that case, it may be advantageous to modify the logistics chain by selecting a next logistics node 112 having a smaller current inventory 124. Finally, an asset identifier 150 may specify asset active ingredients 174 that may provide additional information on asset perishability and sensitivity to expected delivery dates.

Smart contracts 120 may also include transaction histories 178 for previously shipped assets. FIG. 1B illustrates N assets within transaction history 178, where each asset may be a same or different asset type 166. The transaction history 178 stores identifying information for the logistics chain used for the previous transactions. Each item within the transaction history 178 may include an asset ID 182, a manufacturer ID 186, at least one logistics ID 190, and an end user ID 194. For some entries, only a single logistics ID 190 (logistics ID A 190A) may be present, while for other entries, multiple logistics IDs 190 may be present. FIG. 1B illustrates up to M logistics IDs 190 for each entry, from logistics ID A 190A through logistics ID M 190M. Each entry of the blockchain history 178 also includes information of the actual amount of time it took to transfer the asset between entities—from the manufacturer node 108 to a first logistics node 112A, from the first logistics node 112A to a second logistics node 112B, to a final logistics node 112L, and from the final logistics node 112L to the consumer 116. The time information may be stored in any of the asset ID 182, manufacturer ID 186, logistics IDs 190, and the end user ID 194.

In some embodiments, the asset ID 182 may be the same as an asset identifier 150. In other embodiments, the asset ID 182 may be different from the asset identifier 150. However, the asset ID 182 is used to find relevant assets within the transaction history 178 so that similar assets and logistics chains may be identified in order to determine expected delivery dates, as described herein. For example, a given logistics node 112 may review the transaction history 178 to find entries where the asset ID, next logistics node(s) (identified by logistics IDs 190), and end user ID 194 are comparable to the current asset being processed.

The manufacturer ID 186 uniquely identifies the manufacturer node 108 used for previous transactions. Thus, it may be useful to compare a current transaction 136 with previous transactions 136 having the same source, or manufacturer ID 186. Additionally, for a new asset being shipped by a manufacturer node 108, it may be helpful for the manufacturer node 108 to review the transaction history 178 in order to determine an initial expected delivery date. For example, a manufacturer node 108 may review entries within the transaction history 178 to identify entries having the same manufacturer ID 186 as itself, the same end user ID 194, and the same asset ID 182 as the asset about to be shipped. The entries may include different combinations of one or more logistics IDs 190 resulting in different expected delivery dates. Based on the expiration date 154 of the asset to be shipped, a manufacturer node 108 may choose a logistics chain (i.e. combination of one or more logistics IDs 190 and corresponding logistics nodes 112) that may be expected to deliver the asset to the end user ID 194 before the expiration date 154. A manufacturing node 108 may also consider current inventories 124 for various logistics nodes 112 in determining the logistics chain to ship the asset.

Figure 2A:
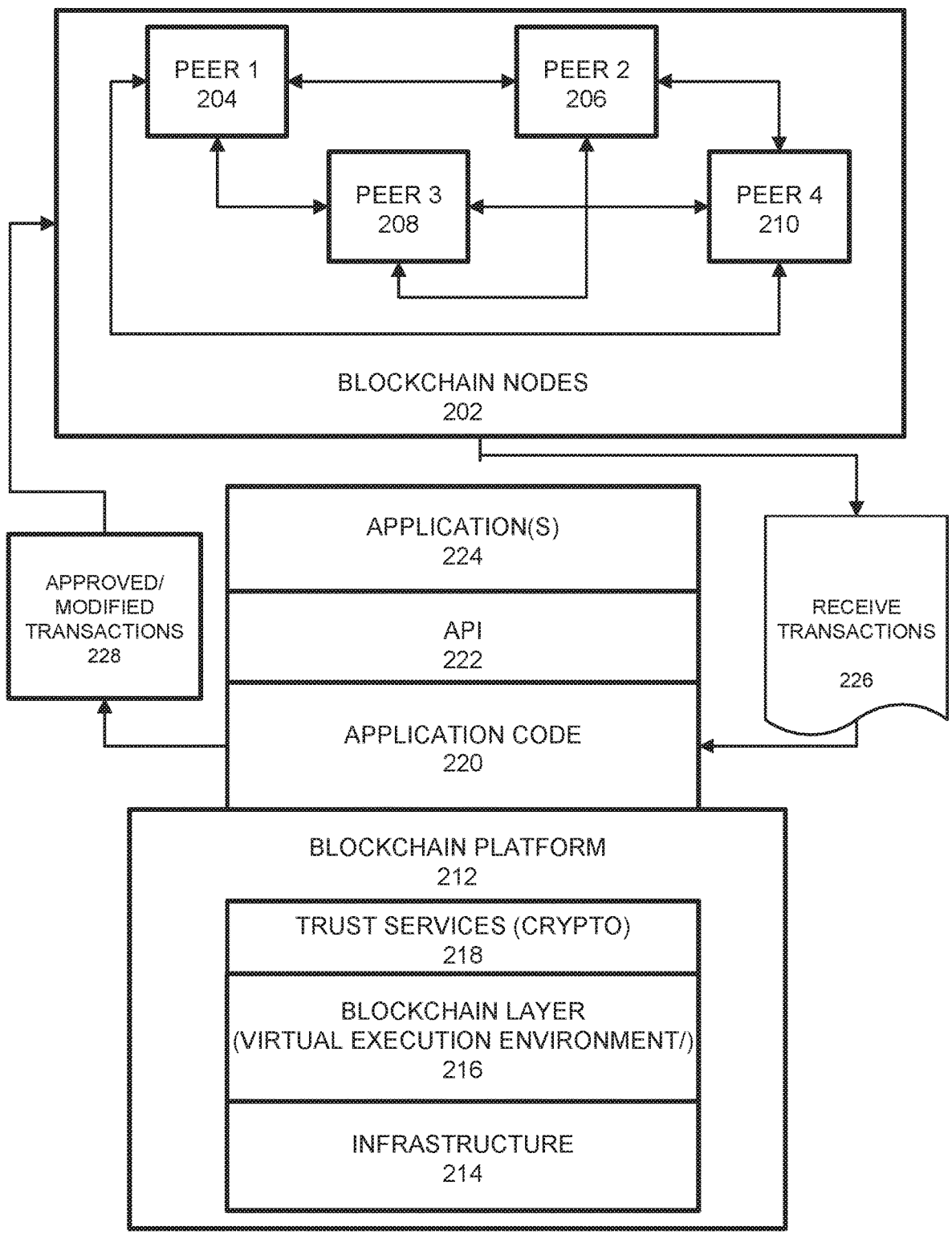
FIG. 2A illustrates an example peer node blockchain architecture configuration for an asset delivery scenario, according to example embodiments.

FIG. 2A illustrates an example peer node blockchain architecture configuration for an asset delivery scenario, according to example embodiments. Referring to FIG. 2A, the blockchain architecture 200 may include certain blockchain elements, for example, a group of blockchain nodes 202. The blockchain nodes 202 may include one or more nodes 204-210 (these nodes are depicted by example only). These nodes participate in a number of activities, such as blockchain transaction addition and validation process (consensus). One or more of the blockchain nodes 204-210 may endorse transactions and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, receive transactions 226 may be processed by one or more processing entities (e.g., virtual machines) included in the blockchain layer 216. The approved/modified transactions 228 may include an asset identifier 150, an expiration date 154, and an end user identifier 158. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details. In FIG. 2A, transactions for shipping assets to consumers are received in box 226. One function may be to review transactions for validity and provide approved or modified transactions to blockchain nodes in box 228, which may be provided to one or more of the nodes 204-210.

Figure 2B:
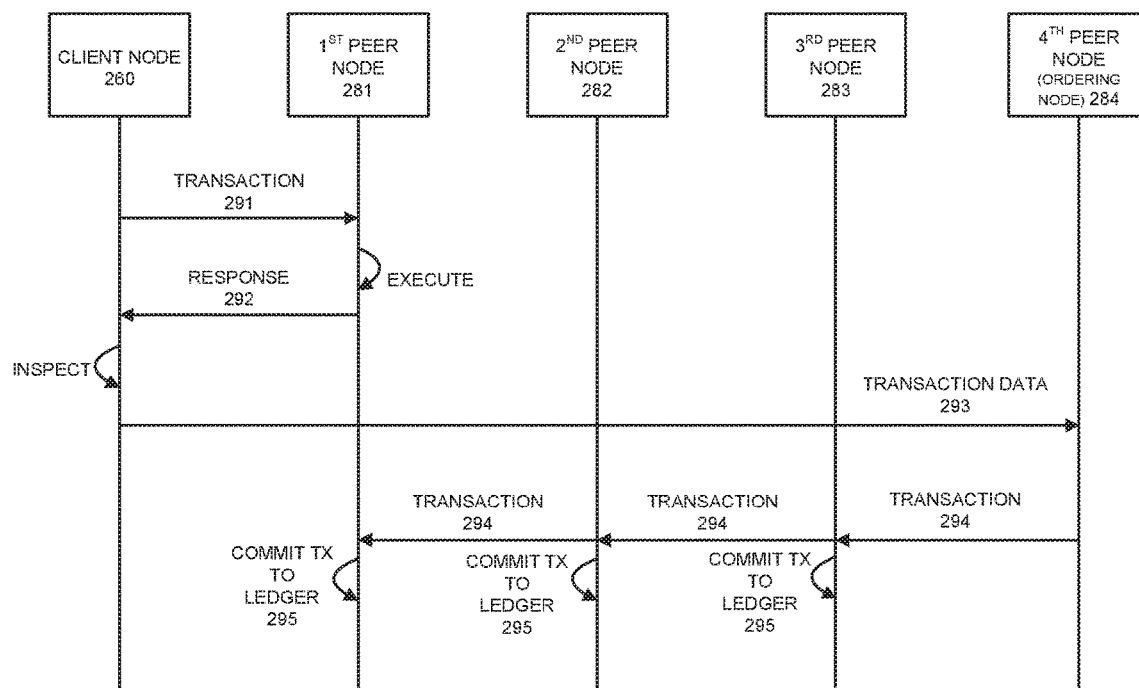
FIG. 2B illustrates an example peer node blockchain configuration, according to example embodiments.

FIG. 2B illustrates an example peer node blockchain configuration 250, in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), such as NODE, JAVA, PYTHON, and the like, which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peer's signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted to notify the client application that the transaction (invocation) has been immutably appended to the chain, as well as to notify whether the transaction was validated or invalidated.

Figure 3:
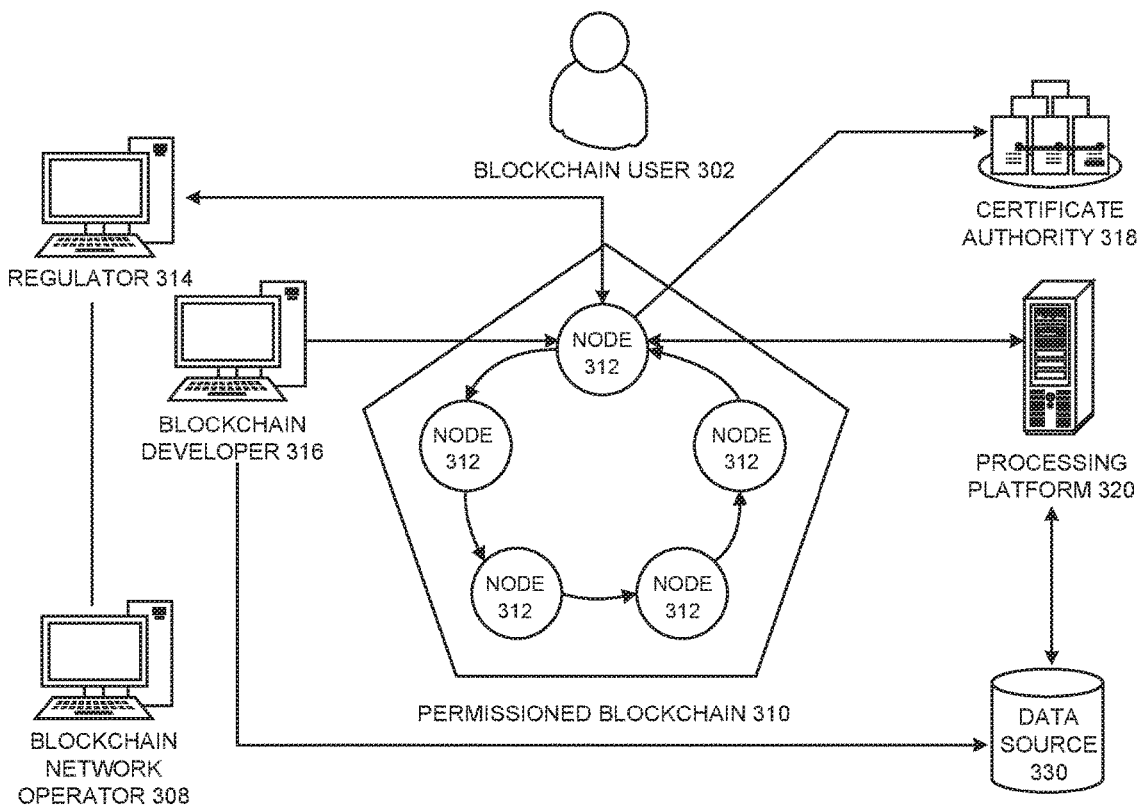
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke, or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4:
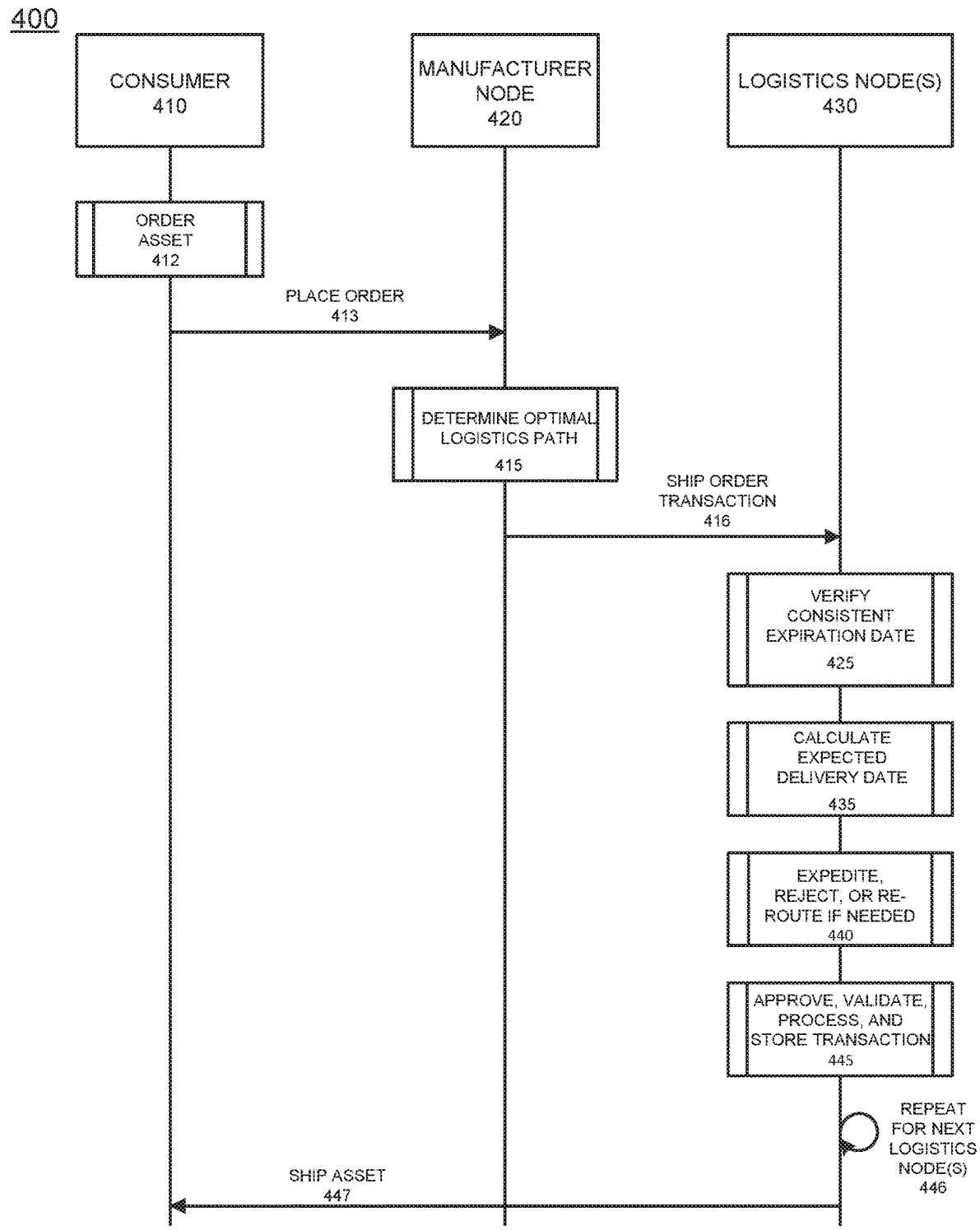
FIG. 4 illustrates a system messaging diagram for performing asset logistics within a blockchain, according to example embodiments.

FIG. 4 illustrates a system messaging diagram for performing blockchain state simulation and validation, according to example embodiments. Referring to FIG. 4, the system diagram 400 includes one or more manufacturer nodes 420, one or more logistics nodes 430, and a consumer 410. The consumer 410 orders an asset 412 to start the process, where the asset is a perishable product such as a drug or prescription or any other product having an expiration date 154.

The consumer 410 places an order 413 with a manufacturer node 420, which may be part of either a public or permissioned blockchain network 104. After receiving the order 413, the manufacturer node 420 determines an optimal logistical path 415, using one or more logistics nodes 430. The optimal logistics path 415 may specify logistics nodes 430 allowing one of a fastest delivery of the ordered asset to the consumer 410, a lowest cost delivery of the ordered asset to the consumer 410, a use of trusted logistics nodes 430, or any other criteria that is expected to deliver the asset to the consumer by the expected delivery date.

Once the optimal logistics path 415 has been determined, the manufacturer node 420 creates a blockchain transaction and transfers the asset to a first logistics node 430. The ship order transaction 416 includes an asset identifier 150, an expiration date 154 for the asset, and an end user identifier 158 for the consumer 410.

In response to receiving the ship order transaction 416 from the manufacturer node 420, the logistics node 430 verifies a consistent expiration date 425 for the asset by reviewing previous transactions 136 (if any) having the same asset identifier 150 (i.e. the same order). In some cases, it may be necessary to review previous transactions 136 back to a genesis block for a blockchain. If the expiration date 154 for the previous transactions 136 is the same as the ship order transaction 416, then the expiration date 154 has been verified as consistent.

Next, the logistics node 430 calculates an expected delivery date 435. Perishable assets require calculating the expected delivery date at each step in the logistics chain since delays for various reasons routinely occur which affect the expected delivery date. In some cases, there may have been delays causing the expected delivery date to change from when it was initially determined when the manufacturer node 420 determined the optimal logistics path 415. In other cases, certain logistics nodes 430 may have a large supply of various assets that may create a shipping bottleneck that induces delays.

Once the expected delivery date 430 is determined, various actions may be taken depending on comparing the expected delivery date to the expiration date 154 for the asset. If the expected delivery date is before the expiration date 154, then no adjustment to the order may be required. However, if the expected delivery date is after the expiration date 154, then several alternatives may be utilized. For example, if the asset is able to be expedited through one or more logistics nodes 430 such that the expected delivery date is before the expiration date 154, then the order may be expedited. In some cases, a logistics node 430 reviews current inventories 124 for other logistics nodes 430 in the logistics chain, and re-routes the logistics chain to transfer the asset through a different logistics node 430 than an original logics node 430 if the different logistics node 430 has a lower current inventory 124 than the original logistics node 430. Finally, if no form of expediting or re-routing will cause the expected delivery date to occur before the expiration date 154, the asset may be rejected and not transferred to a next logistics node 430 or the consumer 410.

If the asset is not rejected, the transaction 416 is approved, validated, and stored to the blockchain 445. These actions also cause the asset to either be transferred to a next logistics node 446, or, if the logistics node 430 is the final logistics node 430 in the logistics chain (i.e. logistics node 112L of FIG. 1A), ship the asset 447 to the consumer 410. The next logistics nodes 430 would execute steps 425, 435, 440, 445, and either 446 or 447, as required. In this way, a perishable asset is reliably delivered to a consumer 410, making sure that the consumer 410 will receive a non-perishable asset and all transactions are immutably stored to the blockchain.

Figure 5A:
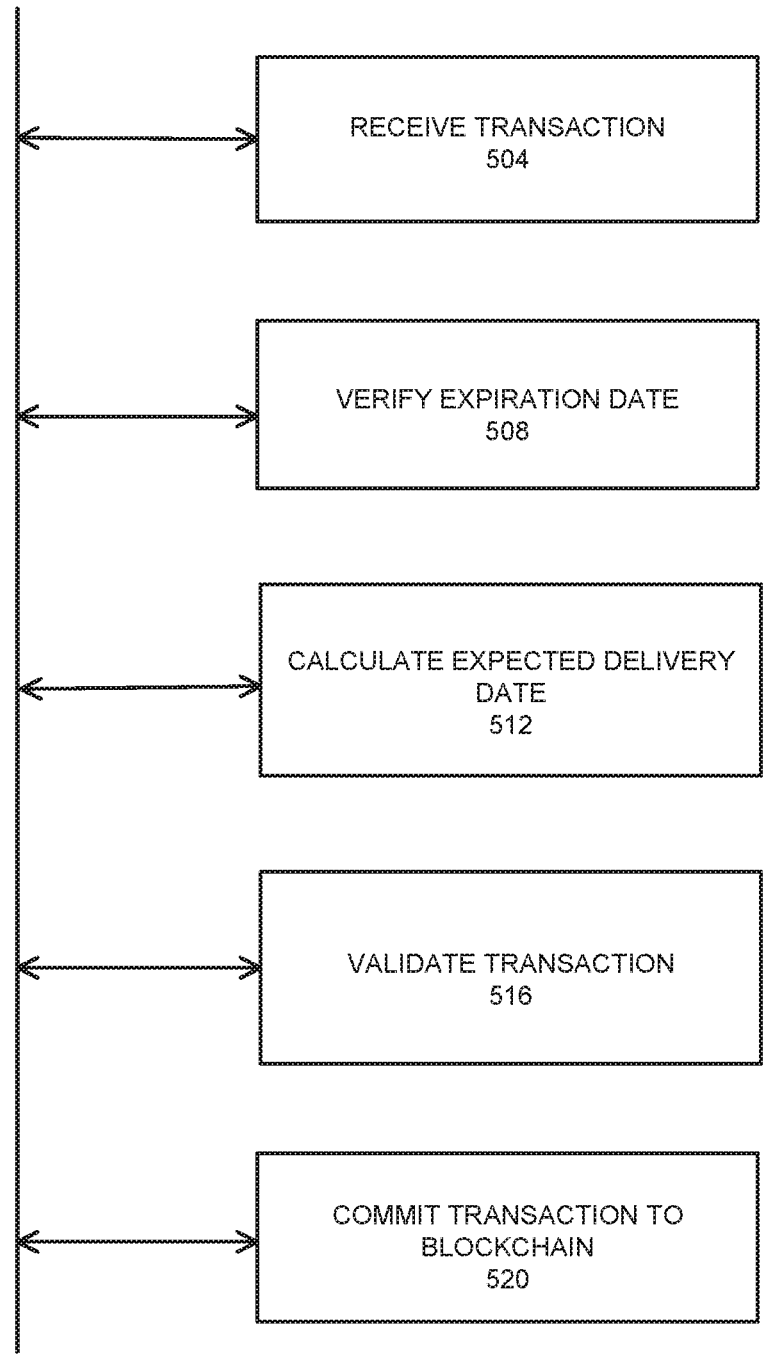
FIG. 5A illustrates a flow diagram of an example method of tracking assets in a blockchain, according to example embodiments.

FIG. 5A illustrates a flow diagram of an example method of tracking assets in a blockchain, according to example embodiments. Referring to FIG. 5A, the method 500 may include one or more of the illustrated steps. At block 504, a logistics blockchain node 430 receives a transaction 136. The transaction 136 specifies shipping an asset to a destination, where the destination is either another logistics node 430 or a consumer 116/410 or end user.

At block 508, the receiving logistics node 430 validates an expiration date 154 for the asset. The transaction 136 includes an expiration date 154 for the asset, which is a perishable good. Since validated transactions 136 are stored on the blockchain, records exist back to the manufacturer node 420 transferring the asset to a first logistics node 430. If the current transaction 136 is the initial transaction (i.e., reflecting the manufacturer node 420 transferring the asset to the first logistics node 430), then no history 178 will be available from previous transactions 136 and the expiration date 154 is assumed to be valid. However, for transactions 136 where there is one or more previous transactions 136 for the asset, the expiration date 154 may be validated by comparing the expiration date 154 in the current transaction 136 to the expiration date 154 for the previous transactions 136. If all expiration dates 154 match, then the expiration date 154 is a valid expiration date 154 and flow proceeds to block 512. If all expiration dates 154 do not match, then the expiration date 154 is not a valid expiration date 154 and has been tampered with. In that case, there is no need to calculate an expected delivery date or validate the transaction 136 since it is likely the actual expiration date 154 is after the expected delivery date—and may have already expired. Further steps may include, but is not limited to, any combination of returning the asset to the manufacturer node 420, destroying the asset, notifying the manufacturer node 420, notifying the consumer 410, or notifying a regulator node in the blockchain network 104 (not shown).

At block 512, the logistics node 430 calculates an expected delivery date for the asset to the consumer 410. In one embodiment, the logistics node 430 reviews transaction histories 178 for relevant assets. In one embodiment, relevant assets include assets having the same asset type 166. In another embodiment, relevant assets include assets having an asset type 166 within a range of asset types 166. Transaction histories 178 are described in more detail with respect to FIG. 1B. The concept is that by reviewing comparable transaction histories 178 containing actual delivery dates, it is possible to predict with some accuracy an expected delivery date for the asset. This block also includes comparing the expected delivery date to the asset expiration date 154, and verifying that the expiration date 154 is not after the expected delivery date.

At block 516, the blockchain nodes validate the transaction 136. At this point, it has been determined the asset expiration date 154 is still valid, and the expected delivery date is not after the expiration date 154. Therefore, the asset while perishable is expected to be delivered while the asset is still good, and the transaction 136 is approved and validated by the blockchain nodes.

At block 520, the approved and validated transaction 136 is added to the blockchain by committing the transaction 136. The transaction 136 is included within a new block and appended to the blockchain. This increases the transaction history 178 for the asset, and any following logistics nodes 430 in the logistics chain for the asset will verify the asset expiration date 154 using the current transaction 136.

Figure 5B:
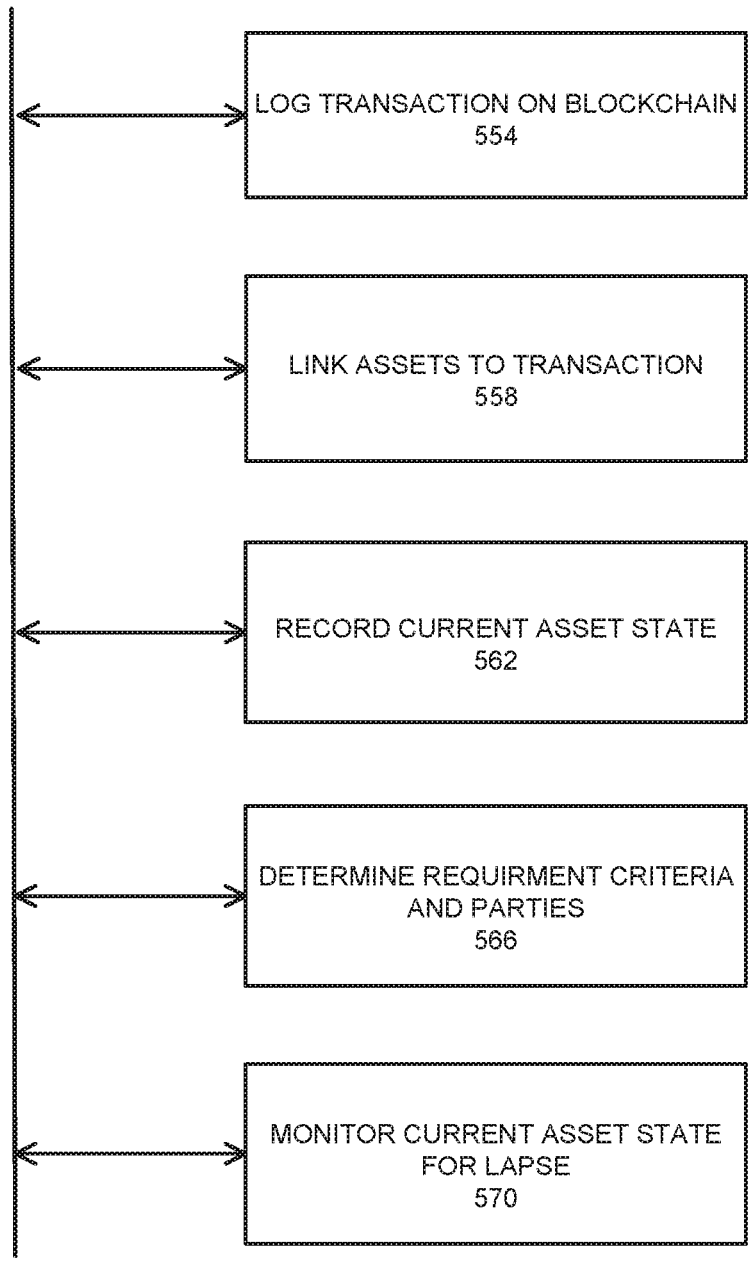
FIG. 5B illustrates a flow diagram of an example method of tracking linked assets in a blockchain, according to example embodiments.

FIG. 5B illustrates a flow diagram 550 of an example method of handling logistics within in a blockchain, according to example embodiments. Referring to FIG. 5B, the method 550 may also include one or more of the following steps.

At block 554, the blockchain network logs a transaction on a blockchain. Transactions can occur utilizing a blockchain which can maintain a log of transactions. The transactions on the blockchain are usually related to a purchase or sale of goods or assets. The assets are therefore part of the blockchain transaction even though the transactions may not specify the asset data.

At block 558, the blockchain network links an asset to the blockchain. The raw materials can be linked to the blockchain by an identifier and then the ultimate product can be linked back to the raw materials used to make the product. The final products can be the assets linked to the blockchain and provided to or accessed by the consumers operating on the blockchain. Other entities and information, such as transport services, containers, truck/ship rental purchases, etc. can be assets which are linked to the blockchain for the product manufacturers, producers, etc., operating on the blockchain.

At block 562, the blockchain network records a current asset state. The asset state may include a date, quality level, certification, organic label, perishable label, etc. The asset state may also be a part that is being manufactured and could be currently logged as being in particular state, such as 'created', 'machine X worked on it', 'machine Y polished it', 'packed', 'shipped', etc. The states will be stored on the blockchain.

At block 566, the blockchain network determines requirement criteria and parties. The requirement criteria may include a product rating, product compliance measure, certification, etc. The current asset state may include a produced state. The current asset state can change to a consumed state responsive to a lapse in a period of time. The current asset state can also be unlinked on the blockchain responsive to receiving an indication that the one or more assets are consumed or are no longer active or have been removed.

Each of the parties to the blockchain transactions (which are performed via one or more devices including a processor and memory—not shown) may have access to product and/or service information, such as asset state information, linkage information from one product to the next to identify a chain of custody of products and services, etc. The suppliers are generally the parties with the earliest blockchain transaction data, such as raw material purchases, shipping purchases for products purchased, etc. The consumers generally create the later and more recent transaction data by purchasing the products, which were created and shipped by the suppliers. Transport services and producers are part of the entire sequence of blockchain transactions, which may have common associations with the blockchain on a periodic basis since those types of services are used in many different types of transactions.

At block 570, the blockchain network monitors current asset state for a lapse in the requirement criteria. The current asset state may perform creating an alert responsive to identifying the current asset state has lapsed in the requirement criteria, for example, if the asset has changed its status, the status could be indicative of a violation of the requirement criteria and all interested parties should be informed via a message originating from the blockchain. In addition, as more transactions occur on the blockchain, it can be determined whether any changes to the asset state have occurred and whether any changes to the requirement criteria have occurred based on the additional transactions.

Figure 6A:
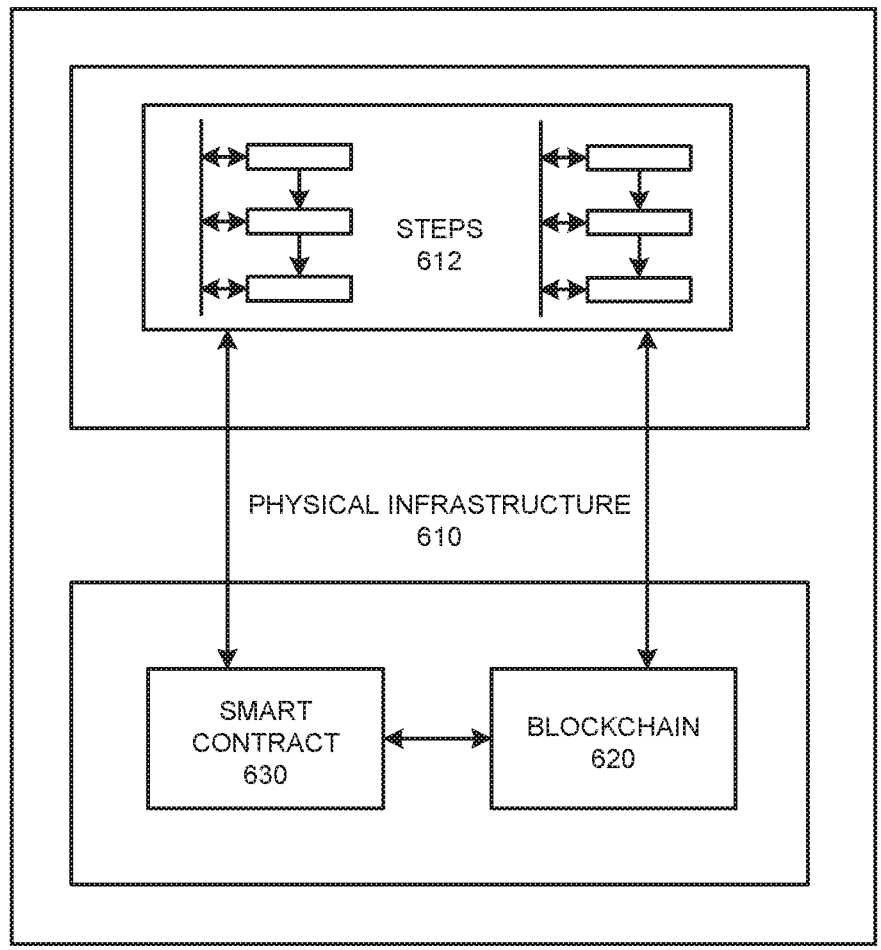
FIG. 6A illustrates an example physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. The steps/operations 612 may include one or more of the steps described or depicted in one or more flow diagrams and/or logic diagrams. The steps may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
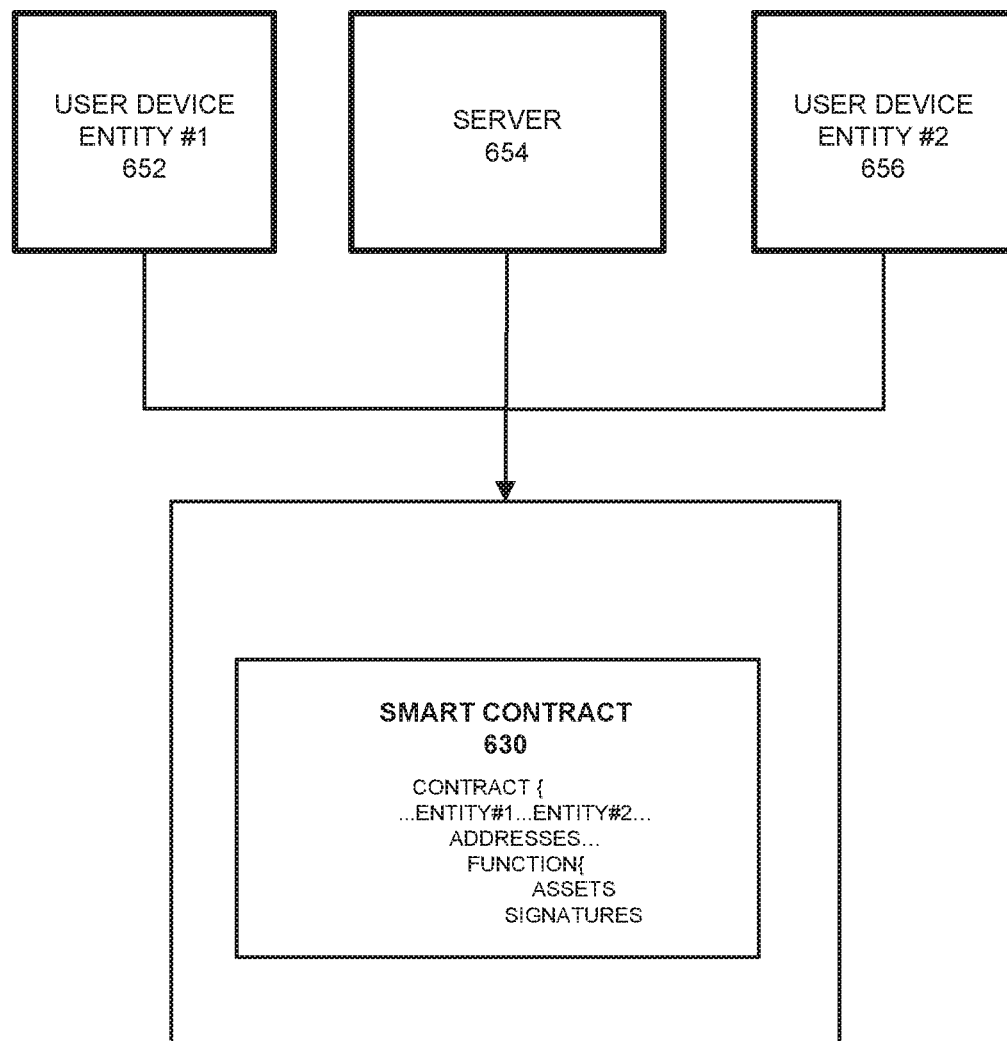
FIG. 6B illustrates an example smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656, which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example computer system architecture 700, which may represent or be integrated in any of the above-described components, etc.

Figure 7:
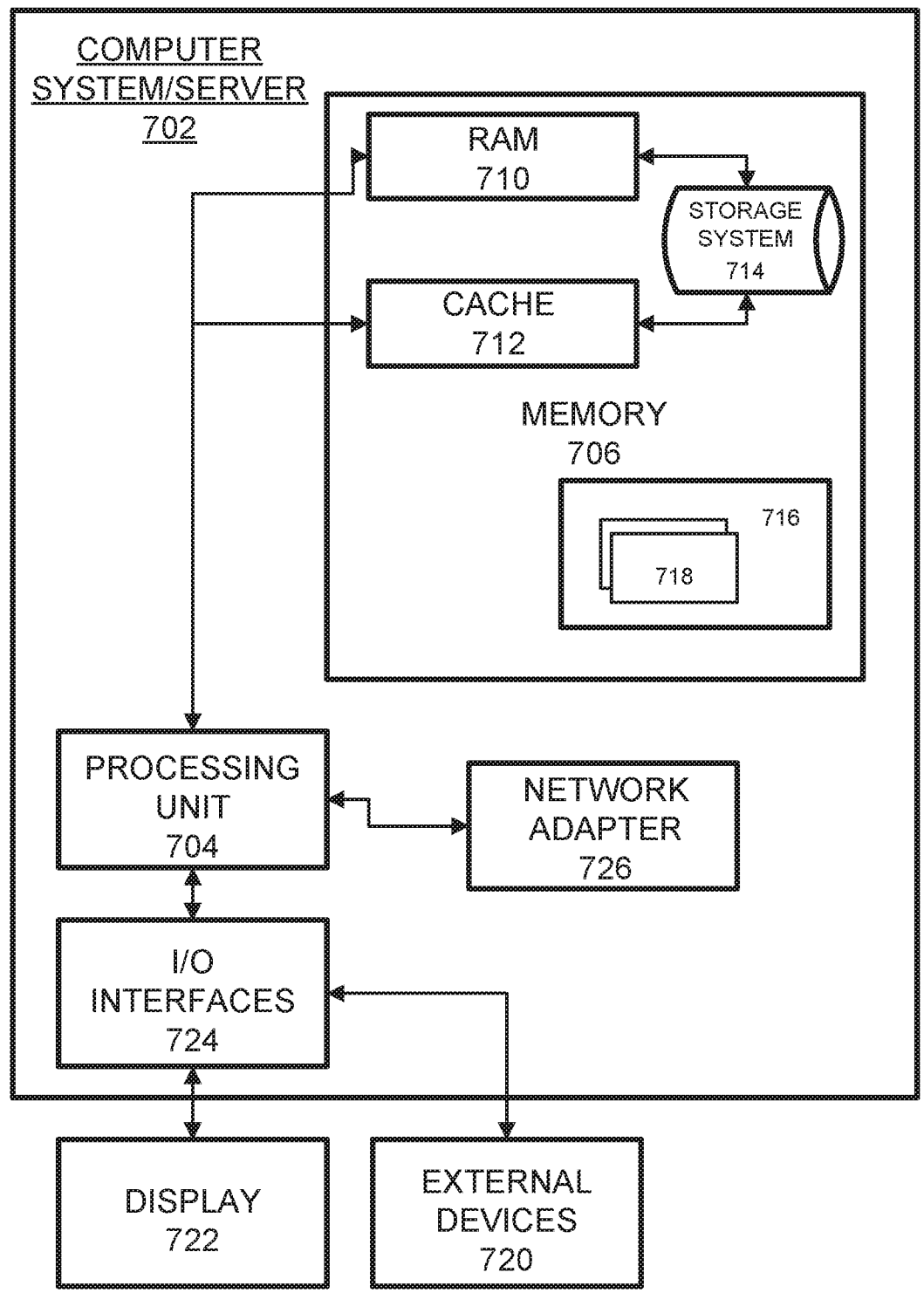
FIG. 7 illustrates an example computer system configured to support one or more of the example embodiments.

FIG. 7 is not intended to suggest any limitation as to the scope of use or functionality of embodiments of the application described herein. Regardless, the computing node 700 is capable of being implemented and/or performing any of the functionality set forth hereinabove.

In computing node 700 there is a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 704, a system memory 706, and a bus that couples various system components including system memory 706 to processor 704.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media. System memory 706, in one embodiment, implements the flow diagrams of the other figures. The system memory 706 can include computer system readable media in the form of volatile memory, such as random-access memory (RAM) 710 and/or cache memory 712. Computer system/server 702 may further include other removable/non-removable, volatile/non-volatile computer system storage media. By way of example only, storage system 714 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 706 may include at least one program product having a set (e.g., at least one) of program modules that are configured to carry out the functions of various embodiments of the application.

Program/utility 716, having a set (at least one) of program modules 718, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. Program modules 718 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 702 may also communicate with one or more external devices 720 such as a keyboard, a pointing device, a display 722, etc.; one or more devices that enable a user to interact with computer system/server 702; and/or any devices (e.g., network card, modem, etc.) that enable computer system/server 702 to communicate with one or more other computing devices. Such communication can occur via I/O interfaces 724. Still yet, computer system/server 702 can communicate with one or more networks such as a local area network (LAN), a general wide area network (WAN), and/or a public network (e.g., the Internet) via network adapter 726. As depicted, network adapter 726 communicates with the other components of computer system/server 702 via a bus. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
receiving, by a blockchain node of a blockchain, a transaction comprising an asset identifier and an expiration date of an asset included in the transaction;
identifying, via a cognitive engine of the blockchain node, previous transactions of assets of a same type from the blockchain based on the asset identifier;
predicting, via execution of a machine learning algorithm by the cognitive engine of the blockchain node, a future delivery date for the asset based on delivery times of the assets of the same type which are included in the previous transactions identified from the blockchain; and
in response to the predicted future delivery date being later than the expiration date of the asset, one or more of sending an alert to a computing system associated with the transaction and re-routing a path of the asset.

2. The method of claim 1, wherein the transaction further comprises an end user identifier, the end user identifier identifying a consumer to receive the asset, and the asset being perishable and not recommended for use after the expiration date.

3. The method of claim 1, further comprising:
re-routing the asset to a different logistics node, in response to the predicted future delivery date being later than the expiration date.

4. The method of claim 1, wherein the predicting comprises inputting information about the previous delivery times of the previous transactions into the machine learning algorithm executed by the cognitive engine which predicts the future delivery date based on the input.

5. The method of claim 1, wherein the predicting comprises:
obtaining a logistics history for relevant assets comprising a same or similar asset type as the asset;
reviewing the logistics history to determine one or more actual delivery dates for the relevant assets; and
predicting the future delivery date of the asset based on the one or more actual delivery dates.

6. The method of claim 1, wherein in response to the predicted future delivery date being later than the expiration date, the method further comprises:
adjusting the predicted future delivery date by changing a logistics path of the asset to a different logistics path.

7. The method of claim 1, further comprising rejecting the transaction comprising one or more of:
sending an alert to a consumer; and
reordering the asset and creating a second transaction corresponding to reordering the asset.

8. A system, comprising:
a memory; and
a processor, coupled to the memory, configured to:
receive, by a blockchain node of a blockchain, a transaction that comprises an asset identifier and an expiration date of an asset included in the transaction;
identify, via a cognitive engine of the blockchain node, previous transactions of assets of a same type from the blockchain based on the asset identifier;
predict, via execution of a machine learning algorithm by the cognitive engine of the blockchain node, a future delivery date for the asset based on delivery times of the assets of the same type which are included in the previous transactions identified from the blockchain; and
in response to the predicted future delivery date being later than the expiration date of the asset, the processor is further configured to one or more of send an alert to a computing system associated with the transaction and re-route a path of the asset.

9. The system of claim 8, wherein the transaction further comprises an end user identifier, the end user identifier identifies a consumer to receive the asset, and the asset being perishable and not recommended for use after the expiration date.

10. The system of claim 8, wherein the processor is configured to re-route the asset to a different logistics node in response to the predicted future delivery date being later than the expiration date.

11. The system of claim 8, wherein the processor is configured to input inputting information about the previous delivery times of the previous transactions into the machine learning algorithm executed by the cognitive engine which predicts the expected future delivery date based on the input.

12. The system of claim 8, wherein the processor is configured to:
obtain a logistics history for relevant assets that comprise a same or similar asset type as the asset;
review the logistics history to determine one or more actual delivery dates for the relevant assets; and
predict the future delivery date of the asset based on the one or more actual delivery dates.

13. The system of claim 8, wherein in response to the predicted future delivery date being later than the expiration date, the processor is further configured to:
adjust the predicted future delivery date by changing a logistics path of the asset to a different logistics path.

14. The system of claim 8, wherein the processor is configured to reject the transaction which comprises one or more of the processor sending an alert to a consumer and reordering the asset and creating a second transaction corresponding to the reordering of the asset.

15. A non-transitory computer readable medium comprising instructions, that when read by a processor, cause the processor to perform a method comprising:
receiving, by a blockchain node of a blockchain, a transaction comprising an asset identifier and an expiration date of an asset included in the transaction;
identifying, via a cognitive engine of the blockchain node, previous transactions of assets of a same type from the blockchain based on the asset identifier;
predicting, via execution of a machine learning algorithm by the cognitive engine of the blockchain node, a future delivery date for the asset based on delivery times of the assets of the same type which are included in the previous transactions identified from the blockchain; and in response to the predicted future delivery date being later than the expiration date of the asset, one or more of sending an alert to a computing system associated with the transaction and re-routing a path of the asset.

16. The non-transitory computer readable medium of claim 15, wherein the transaction further comprises an end user identifier, the end user identifier identifying a consumer to receive the asset, and the asset being perishable and not recommended for use after the expiration date.

17. The non-transitory computer readable medium of claim 15, wherein the method further comprises:
re-routing the asset to a different logistics node, in response to the predicted future delivery date being later than the expiration date.

18. The non-transitory computer readable medium of claim 15, wherein the predicting comprises inputting information about the previous delivery times of the previous transactions into the machine learning algorithm executed by the cognitive engine which predicts the future delivery date based on the input.

19. The non-transitory computer readable medium of claim 15, wherein the predicting comprises:
obtaining a logistics history for relevant assets comprising a same or similar asset type as the asset;
reviewing the logistics history to determine one or more actual delivery dates for the relevant assets; and
predicting the future delivery date of the asset based on the one or more actual delivery dates.

20. The non-transitory computer readable medium of claim 15, wherein in response to the predicted future delivery date being later than the expiration date, the method further comprises:
adjusting the predicted future delivery date by changing a logistics path of the asset to a different logistics path.

* * * * *